United States Patent [19]
Nazzer et al.

[11] 3,983,226
[45] Sept. 28, 1976

[54] GAS STRIPPING AND RECIRCULATION PROCESS IN HEAVY WATER SEPARATION PLANT

[75] Inventors: Don Barkley Nazzer, Port Hawkesbury, Canada; Victor R. Thayer, Newark, Del.

[73] Assignee: Atomic Energy of Canada Limited, Ottawa, Canada

[22] Filed: Apr. 21, 1971

[21] Appl. No.: 135,874

Related U.S. Application Data

[63] Continuation-in-part of Ser. No. 846,159, July 30, 1969, abandoned.

[52] U.S. Cl. ............................ 423/580; 423/648; 423/563; 23/260; 23/270.5 W; 23/284
[51] Int. Cl.² ................... B01D 19/00; C01B 5/02
[58] Field of Search ................ 423/580, 563, 648; 23/260, 284, 270.5 W

[56] References Cited
UNITED STATES PATENTS
3,437,567   4/1969   Bogart .......................... 423/563 X

*Primary Examiner*—Earl C. Thomas
*Attorney, Agent, or Firm*—Beveridge, DeGrandi, Kline, Lunsford

[57] ABSTRACT

Hydrogen sulphide is stripped from hot effluent, in a heavy water separation plant of the dual temperature isotope separation type, by taking liquid effluent from the hot tower before passage through the humidifier, passing the liquid through one or more throttle devices to flash-off the H₂S gas content, and feeding the gas into an absorption tower containing incoming feed water, for recycling of the gas through the process.

6 Claims, 1 Drawing Figure

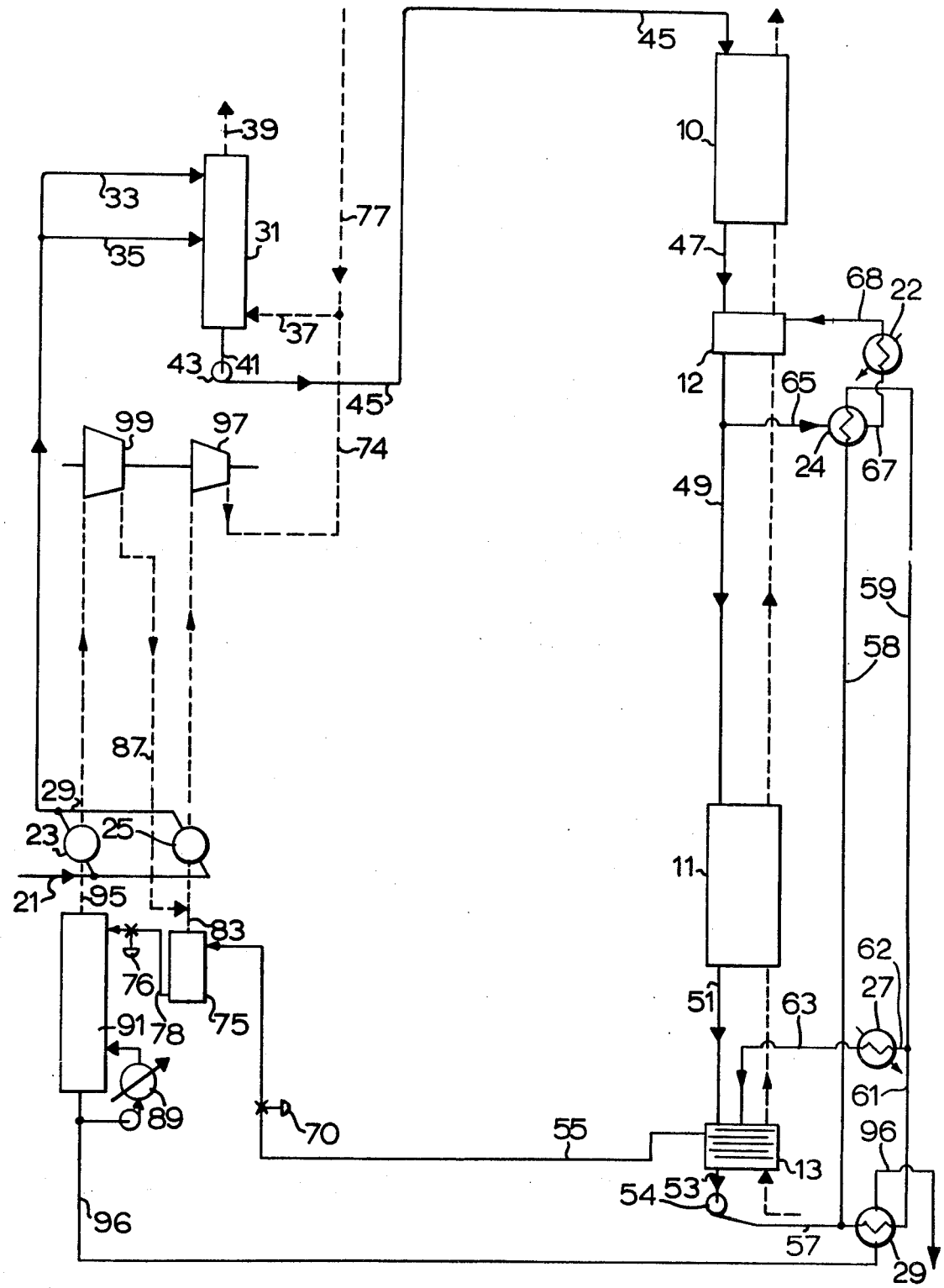

GAS STRIPPING AND RECIRCULATION PROCESS IN HEAVY WATER SEPARATION PLANT

This application is a continuation-in-part of application Ser. No. 846,159, filed July 30, 1969, and now abandoned.

This invention is directed to a method of stripping or recovering a soluble gas from a solvent, and to apparatus for carrying out the method. In particular the method is directed to the removal of hydrogen sulphide from the effluent of an isotope exchange process utilizing hydrogen sulphide and water for the separation or concentration of deuterium oxide.

Heavy water otherwise known as deuterium oxide which occurs in nature at a ratio of about one part in 7,000 parts water is concentrated by numerous processes, including the hot and cold tower isotope separation process. In such a process feed water containing the low proportion of deuterium oxide to be concentrated is passed through a cold tower and a hot tower in counterflow isotopic exchange relation with a gas containing hydrogen in chemical composition.

Owing to the fact that gases such as hydrogen sulphide ($H_2S$) that are suitable for this process are partially soluble in water, the problem arises that owing to the large quantities of feed water passing through a heavy water plant there is a large wastage of the gas, unless effective stripping of the gas from the water effluent can be effected.

In a previous stripping process described in Canadian Pat. No. 612,087 issued Jan. 10th, 1961 to Spevack there is illustrated a high pressure stripping arrangement in which the feed water passing from the hot tower is passed through a stripper, having the heat required for stripping supplied by a direct injection of steam. The $H_2S$ thus evolved from the effluent is passed as feed gas back to the hot tower from whence the effluent came. The heat contained in the effluent is partially recovered by heat interchange with the effluent entering the stripper, and partially by further heat interchange with the effluent flowing from the cold tower to the hot tower.

This previous arrangement suffered from the disadvantage that is utilized the injection of steam in excess of cycle pressure. With the increase of cycle pressures from the cited 75 to 83 psi (pounds per square inch) of Spevack to pressures in the order of 300 psi, in order to optimize plant design, adoption of the earlier stripping arrangement would require the use of steam for direct injection at about 350 psi.

The present invention provides stripping of hydrogen sulphide from liquor of low deuterium content as it leaves the hot tower. The extracted liquor has a relatively low gas content absorbed therein. A fractionating tower or column operating at low pressure is provided so that low grade steam at relatively low cost may be utilized. A heat exchange arrangement is also provided whereby a portion of the heat content of the stripped liquor is recovered.

An absorption tower is provided for absorbing the stripped $H_2S$ gas in to incoming feed water. This serves also to absorb and purify $H_2S$ purged from the process towers by getting rid of inert gases which would otherwise accumulate in the system. Such accumulated gases dilute the $H_2S$, thereby reducing the productivity of the system.

The present invention thus provides in an isotope concentration process in which hydrogen sulphide gas is passed in counterflow relation with water through a hot tower zone, a cold tower zone and humidity control means, the method of recovering hydrogen sulphide gas dissolved in the water, including the steps of extracting at least a portion of the water from the hot tower zone before passage through a humidifier; reducing the pressure and temperature of the water portion by passage through at least one throttle device to flash off a portion of the gas; passing it through a fractionating column operating at low pressure to remove a further portion of the gas therefrom; and passing the stripped water in heat exchange relationship so as to assist in maintaining the temperature at the hot tower.

Certain embodiments of the present invention are described, reference being had to the attached FIGURE which is a schematic illustration of the subject stripping system.

A portion of the isotopic exchange plant includes a first stage cold tower portion 10 and a first stage hot tower portion 11, having a dehumidifier 12 interposed between the tower portions and a humidifier 13 adjacent the hot water outlet from the hot tower portion 11. The plant includes gas stripping apparatus having an expansion chamber 75, fractionating column 91, gas pumping compressor means 97 and 99 and an absorption tower 31.

In operation feed water entering the concentration plant at 21 passes to an absorption tower 31 by way of inlet pipes 33, 35.

The absorption tower 31 is supplied at the base with $H_2S$ by way of the header 37, carbon dioxide, nitrogen and other inert gases being carried off from the tower 31 by the waste pipe 39. The incoming feed water having $H_2S$ absorbed therein leaves the tower 31 by way of feed pipe 41, being pumped by a pump 43, by way of the delivery 45, to the cold tower 10, the pump 43 serving to raise the pressure of incoming feed water and $H_2S$ gas absorbed therein from the pressure in tower 31 to that of tower portion 10.

The water outlet 47 from the tower 10 carries water to the dehumidifier 12, and thence by pipe 49 to the hot tower 11, flowing thence by way of pipe 51 to the humidifier 13.

A portion only of the upward flowing gas path is shown, being dotted, and leading to the humidifier 13 and thence to the hot tower 11, from where the gas flows to the dehumidifier 12 and thence to the cold tower 10. The details of the gas circulation path are not further illustrated and do not form a part of the present invention except that there is illustrated a fractional gas circulation return line 77 leading from a subsequent stage to the gas header 37 of the absorption tower 31.

The humidifier 13, in addition to receiving incoming hot water from the hot tower 11 by way of the feed line 51 is also provided with a heat input circuit comprising line 53 to pump 54, with the lines 57, 58, 59, 61, 62 connecting with heat exchangers 24, 29 and with a steam heater 27, the line 63 returning to the humidifier 13. Hot water passing downward through the humidifier 13 transfers heat and humidity (water vapor) to the $H_2S$ gas passing upward. Heat exchangers 24, 29 receive heat from the dehumidifier and the gas stripper water outflows respectively.

The heat exchanger 24 receives hot water out of dehumidifier 12, by way of line 65, connecting by line 67 to cooler 22, for water recirculation by line 68 back to dehumidifier 12.

A quantity of the hot mixed liquid effluent or liquor is taken from the humidifier 13, and passes by way of pipe 55 to a throttle device 70 and thence to an expansion chamber 75 in which some of the $H_2S$ flashes off from the hot effluent. The $H_2S$ passes by way of pipe 83 to the gas cooler 25 and thence to compressor 97. After being compressed the $H_2S$ passes by way of lines 74 and 37 to the absorption tower 31.

The residual liquor from the expansion chamber 75 passes to a second throttle device 76 and thence to fractionating column 91 in which the water passes downward in countercurrent flow to water vapor generated by the heat exchanger 89. Water from the base of column 91 passes through the exchanger 89, wherein a portion is vaporized for passage upwardly through column 91. The heat exchanger 89 is heated externally by low pressure steam. The countercurrent passage of liquid and vapor in column 91 strips $H_2S$ from the liquid. This $H_2S$ passes by way of line 95 into cooler 23, to a compressor 99 and thence by lines 87, 83 through cooler 25 and compressor 97 to lines 74 and 37 leading to absorption tower 31. The stripped water then passes to waste by way of line 96, through the heat exchanger 29. The gas coolers 23, 25 may be cooled by the incoming feed water, which is thus preheated.

In operation the gaseous $H_2S$ evolved in expansion chamber 70 and fractionating column 91 passes back to the isotopic exchange process by way of the incoming cold water feed. The isotopic exchange towers are operated at approximately 300 psi, dropping the effluent pressure at the first expansion state 75 to about 100 psi, and then dropping the effluent pressure to about 50 psi in column 91. Stripping is accomplished by using only a relatively small amount of steam at relatively low pressure in the exchanger 89.

By taking the hot liquor from the top collector tray of humidifier 13, where the incoming hot water from tower 11 has been mixed with hot water from the heat circuit input 63, the gas content of the water is minimized, so that the quantities of $H_2S$ to be stripped from the effluent, and to be recompressed for recycling through the process is correspondingly minimized.

The work necessary to return the stripped $H_2S$ to the process by recompression is further reduced by the utilization of the absorption tower 31, to absorb the gas into incoming feed, for effective pressurization to cycle pressure while in a liquid (absorbed) form.

In addition, the heat energy imparted to the recompressed $H_2S$ by the compressors 23, 25 serves to raise the temperature of incoming feed water in the absorption tower 31.

A further unobvious advantage provided by the present arrangement is that the withdrawal of hot liquor from the top collector tray of the humidifier 13 serves to purge the hot tower 11 of non-volatile contaminants such as chlorides which tend to accumulate there. These gaseous contaminants are transferred to the absorbtion tower 31, from which they are desorbed, to pass at 39 from the system.

What I claim as new and desired to secure by letters patent of the United States is:

1. The method of gas recovery and recirculation in a gas/liquid counterflow process for isotopic separation in which hydrogen sulphide is at least partially soluble in the liquid, namely water, there being a pressurized hot isotope exchange zone and a pressurized cold isotope exchange zone for effecting isotope exchange between water and the gas at a predetermined process pressure, including the steps of: extracting at least a portion of liquid effluent having said gas in solution therein; producing a substantial drop in pressure in said liquid portion to strip hydrogen sulphide gas therefrom at a pressure substantially less than that of a said exchange zone; re-compressing said gas to a pressure less than that of said exchange zone; absorbing the stripped gas into feed water entering the process as a source of deuterium, and pressurizing by pumping the feed water with gas absorbed therein to a said isotope exchange zone to return said stripped gas to said zone.

2. The method as claimed in claim 1 including the step of raising the temperature of said entering feed water by heat exchange relation with said stripped gas.

3. The method as claimed in claim 2 wherein said heat exchange is at least partly effected during said recompressing of said stripped gas, prior to said step of absorbing the stripped gas into the incoming feed water.

4. The method as claimed in claim 1 wherein said liquid portion is extracted after passage downwardly through said hot zone, including the step of raising the temperature of the liquid after said drop in pressure, to evolve additional hydrogen sulphide gas, whereby the gas content of liquid passing to waste is further reduced.

5. In an isotope exchange apparatus having a pressurized hot tower zone, a pressurized cold tower zone, and a humidifier zone providing heated hydrogen sulphide gas to the hot zone and receiving liquid from the hot zone comprising water having said gas absorbed therein, a gas stripping means connected thereto to receive at least a portion of the hot liquid leaving the hot tower zone, including an expansion chamber to provide a significant drop in pressure to said hot zone liquid to separate hydrogen sulphide gas therefrom, gas compressor means connected between said chamber and an absorption tower receiving incoming feed water therein, to re-compress said gas to a pressure less than that in said cold zone, and to pass said gas to said absorption tower wherein said gas is mixed in absorbed relation with said incoming feed water, and pump means connecting said absorption tower to said cold tower zone to pressurize and transfer the feed water and absorbed gas to said cold tower zone.

6. Apparatus as claimed in claim 5 including a heat input circuit connecting with said expansion chamber to raise the temperature of liquid therein whereby the quantity of absorbed hydrogen sulphide gas contained in said hot liquid is reduced.

* * * * *